(12) United States Patent
Polaganga et al.

(10) Patent No.: US 12,538,162 B2
(45) Date of Patent: Jan. 27, 2026

(54) TRAFFIC RECONFIGURATION FOR USER THROUGHPUT

(71) Applicant: T-Mobile USA, Inc., Bellevue, WA (US)

(72) Inventors: Roopesh Kumar Polaganga, Bothell, WA (US); Sanjay Baburao Waje, Plano, TX (US); Deepak Nadh Tammana, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 646 days.

(21) Appl. No.: 17/964,707

(22) Filed: Oct. 12, 2022

(65) Prior Publication Data
US 2024/0129783 A1    Apr. 18, 2024

(51) Int. Cl.
*H04W 28/02*    (2009.01)
*H04L 5/14*    (2006.01)

(52) U.S. Cl.
CPC ........... *H04W 28/0236* (2013.01); *H04L 5/14* (2013.01)

(58) Field of Classification Search
CPC .............................. H04W 28/0236; H04L 5/14
See application file for complete search history.

(56) References Cited

U.S. PATENT DOCUMENTS

| | | | |
|---|---|---|---|
| 6,778,517 B1 | 8/2004 | Lou et al. | |
| 7,583,619 B2 | 9/2009 | Edwards | |
| 7,711,365 B2 | 5/2010 | Nakamata | |
| 8,126,472 B2 | 2/2012 | Lee et al. | |
| 8,130,721 B2 | 3/2012 | Chao et al. | |
| 8,176,154 B2 | 5/2012 | Minhazuddin et al. | |
| 8,542,617 B2 | 9/2013 | Choi et al. | |
| 8,792,851 B2 | 7/2014 | Matsumura et al. | |
| 8,923,274 B2 | 12/2014 | Wang et al. | |
| 9,386,608 B2 | 7/2016 | He et al. | |
| 9,419,776 B2 | 8/2016 | Gauvreau et al. | |
| 9,591,653 B2 | 3/2017 | He et al. | |
| 9,730,152 B2 | 8/2017 | Lin et al. | |
| 9,736,861 B2 | 8/2017 | Chatterjee et al. | |
| 10,681,559 B2 * | 6/2020 | Zhu | H04W 68/005 |
| 11,134,487 B2 | 9/2021 | Samdanis et al. | |
| 11,139,931 B2 | 10/2021 | Wei et al. | |
| 11,191,013 B1 | 11/2021 | Kalkunte et al. | |
| 11,337,245 B2 | 5/2022 | Wei et al. | |
| 2007/0218868 A1 | 9/2007 | Schefczik et al. | |

(Continued)

FOREIGN PATENT DOCUMENTS

| | | |
|---|---|---|
| CN | 101278595 B | 4/2012 |
| CN | 103906127 B | 2/2018 |

(Continued)

*Primary Examiner* — Ricky Q Ngo
*Assistant Examiner* — Kabir U Jahangir
(74) *Attorney, Agent, or Firm* — Perkins Coie LLP

(57) ABSTRACT

Systems, methods, and devices that relate to dynamically reconfiguration of network connections to achieve better user throughput are disclosed. In one example aspect, a device for wireless communication comprises a processor that is configured to obtain information regarding service sessions of a user equipment, determine a service type associated with the service sessions based on the information, and selectively reconfigure a network connection of the service type to satisfy a throughput requirement associated with the service type.

20 Claims, 10 Drawing Sheets

(56) References Cited

U.S. PATENT DOCUMENTS

| | | | |
|---|---|---|---|
| 2011/0122783 | A1 | 5/2011 | Lin et al. |
| 2013/0190006 | A1 | 7/2013 | Kazmi et al. |
| 2014/0334351 | A1 | 11/2014 | Yin et al. |
| 2016/0050605 | A1 | 2/2016 | Kim et al. |
| 2018/0192400 | A1* | 7/2018 | Wei .................... H04W 72/1268 |
| 2020/0015303 | A1* | 1/2020 | Tsai ..................... H04W 8/183 |
| 2020/0068647 | A1* | 2/2020 | Jha ...................... H04W 60/005 |
| 2020/0344030 | A1 | 10/2020 | Cheng et al. |
| 2020/0403689 | A1 | 12/2020 | Rofougaran et al. |
| 2021/0022073 | A1* | 1/2021 | Kwok ................... H04W 72/21 |
| 2021/0037588 | A1 | 2/2021 | Zhu et al. |
| 2021/0160945 | A1* | 5/2021 | Abdel Shahid ....... H04W 76/22 |
| 2022/0183093 | A1 | 6/2022 | Sevindik et al. |

FOREIGN PATENT DOCUMENTS

| | | |
|---|---|---|
| CN | 105407511 B | 11/2018 |
| CN | 107046719 B | 5/2020 |
| CN | 108616958 B | 1/2021 |
| CN | 108352974 B | 2/2021 |
| CN | 109600389 B | 6/2021 |
| CN | 109921885 B | 11/2021 |
| EP | 2315492 B1 | 10/2015 |
| EP | 2866498 B1 | 11/2016 |
| EP | 3174329 B1 | 11/2020 |
| EP | 3068181 B1 | 9/2021 |
| KR | 20190019005 A | 2/2019 |

* cited by examiner

TRAFFIC RECONFIGURATION FOR USER THROUGHPUT

BACKGROUND

Network throughput levels can provide valuable information for assessing the network performance. Minimizing packet loss, jitter, and latency are important aspects for improving throughput and providing optimal user experiences to the users.

BRIEF DESCRIPTION OF THE DRAWINGS

Detailed descriptions of implementations of the present technology will be described and explained through the use of the accompanying drawings.

Figure 1:
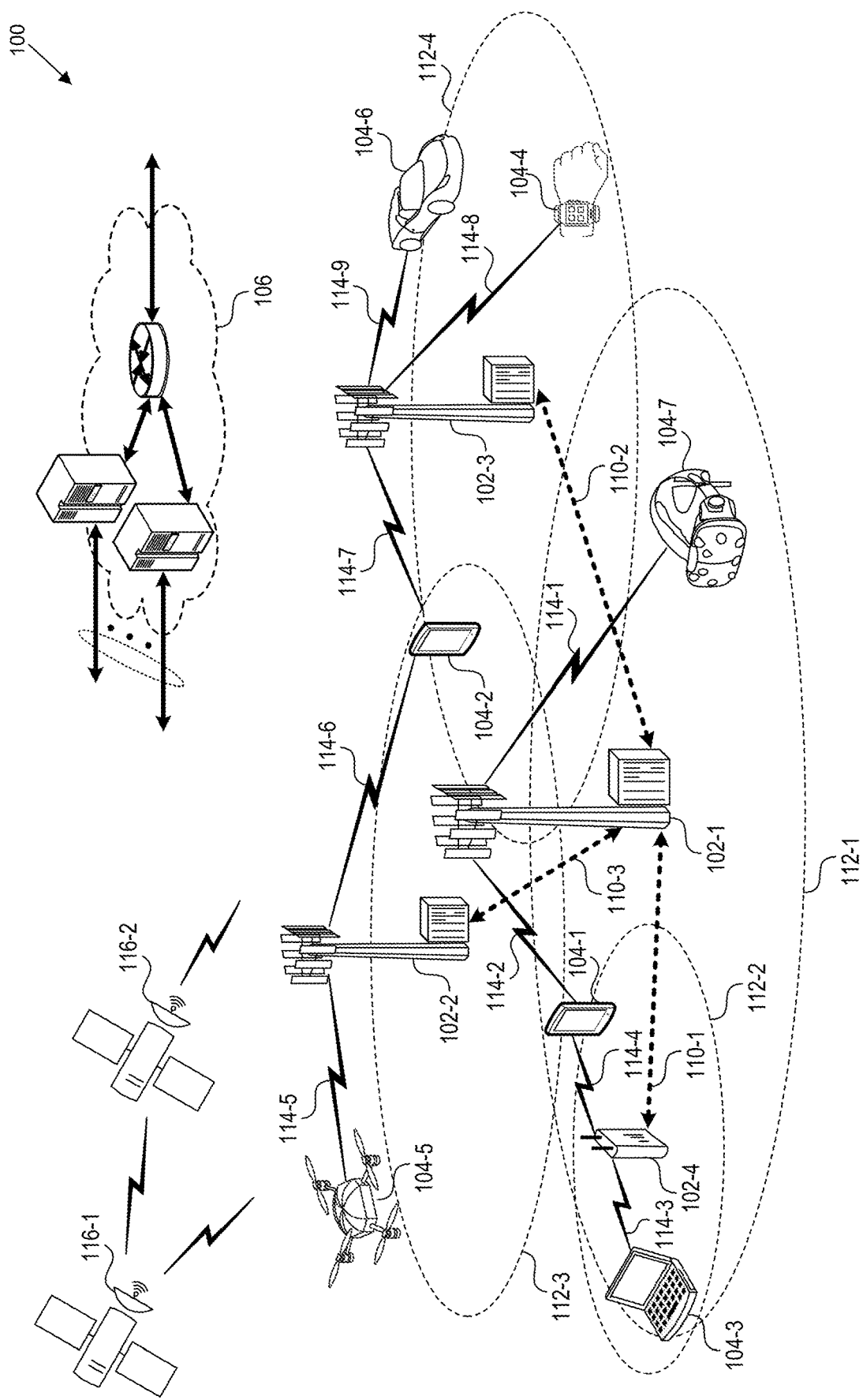
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Different network configurations are provided by network operators to meet different use scenario requirements (e.g., large coverage area, service continuity, sufficient bandwidth and/or throughput etc.). A particular network configuration may provide better performance to one type of use scenarios (e.g., user mobility, service reliability) but fail to match the required performance for other types of scenarios (e.g., bandwidth and/or throughput). Thus, there remains a need for dynamic network reconfiguration to achieve optimal throughput for certain types of users and/or different services. To that end, session-based user device information can be collected at the Radio Access Network (RAN) side to enable the network operators to monitor the performance of the network connections and to proactively reconfigure the connection(s) if needed to improve throughput level for the user traffic, thereby providing better user experience to the users. In particular, network operators can gain visibility, at the RAN level, to various types of information related to the UE and the network connection(s), such as location information of the UE, network statistics, and/or service-related information. Such information is also referred to as location-service data in the document. Network operators can monitor the location-service data of the UE and proactively steer the UE to appropriate Radio Access Technology (RAT), multiplexing modes, and/or frequency layers based on the user types and/or service types so as to provide improved end user experience.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally, or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

Location-Service Data for User Throughput

Network throughput refers to the rate of successful message delivery over a communication link and user throughput refers to the amount of data transmitted or received by a connected user in a network. Throughput is usually measured in bits per second (bit/s or bps), and sometimes in data packets per second (p/s or pps) or data packets per time slot. Throughput requirements can differ based on user types and/or application service types. For example, most users are content consumers, meaning that the traffic associated with such users are mostly downlink traffic from the base station(s) to the user device(s). However, some users are considered as content producers. The content producers produce and upload content from the user device(s) to the network. For such users, a higher level of uplink throughput is needed. As another example, certain application services (e.g., video streaming or gaming services) require much higher throughput level than others (e.g., content browsing or social network communications). In particular, services such as benchmark performance services that allow the users to gauge network conditions and performance require a higher level of throughput in both the downlink and uplink directions.

Figure 2A:
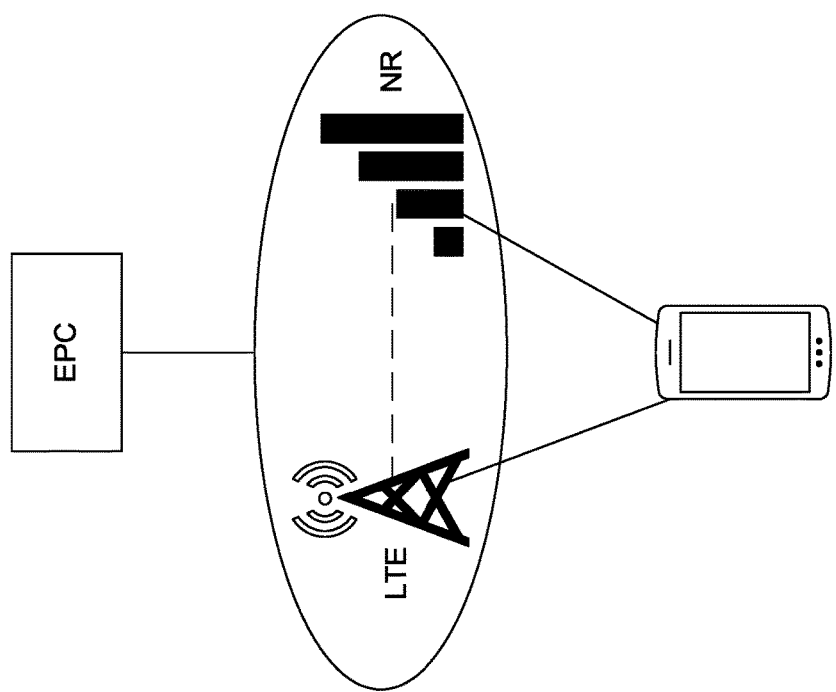
FIG. 2A illustrates an example configuration of Dual Connectivity (DC) in accordance with one or more embodiments of the present technology.
Figure 2B:
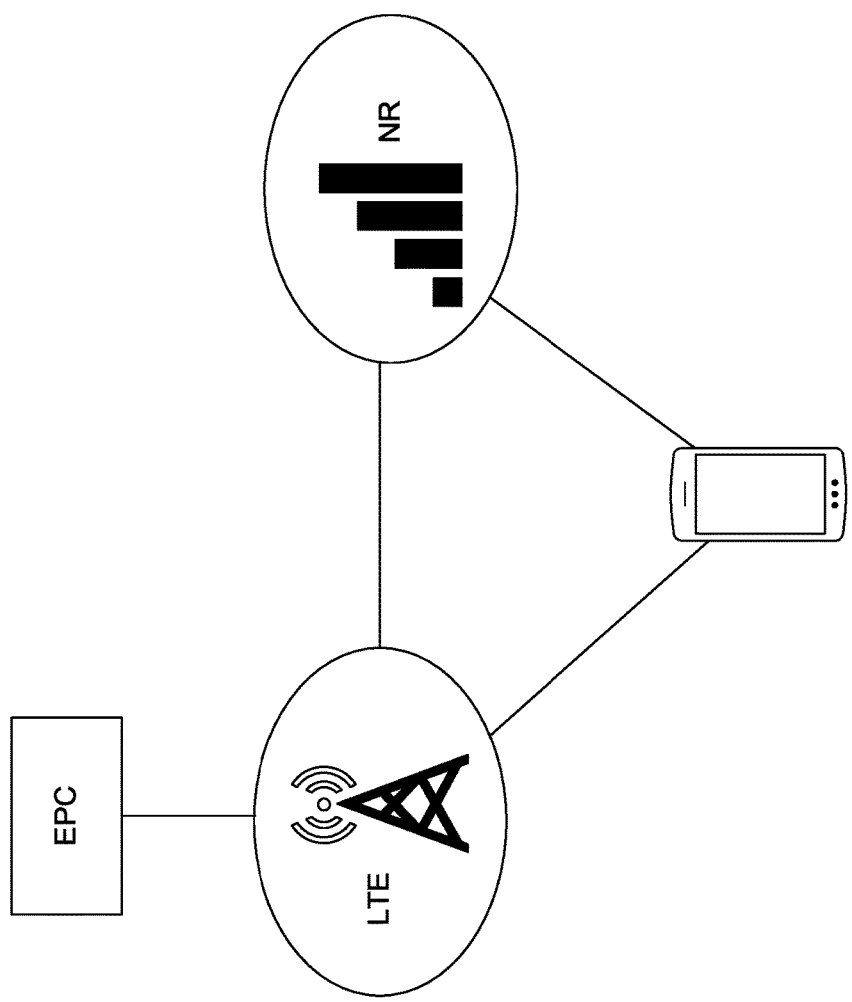
FIG. 2B illustrates another example deployment of DC in accordance with one or more embodiments of the present technology.

With the advance of wireless technology, user mobility and the adoption of different generations of radio access technologies can impact user throughput on the network. For example, to bridge the transition from the Long-Term Evolution (LTE) communication technology to the Fifth Generation (5G) communication technology, network operators provide support for dual connectivity (DC) between LTE systems and 5G systems. FIG. 2A illustrates an example configuration 200 of Dual Connectivity in accordance with one or more embodiments of the present technology. The configuration shown in FIG. 2A is also known as Evolved Universal Mobile Telecommunication Systems (UMTS) Terrestrial Radio Access Network (E-UTRAN) and New Radio (NR) Dual Connectivity (ENDC). In FIG. 2A, an LTE eNodeB is locally connected to a 5G gNB to support both LTE and 5G communication. This type of deployment is also referred to as co-located ENDC. FIG. 2B illustrates another example configuration 250 of DC in accordance with one or more embodiments of the present technology. In FIG. 2B, the eNodeB and gNB are at different locations connected via a backhaul connection. This type of deployment can be referred to as non-co-located ENDC. Network operators can also provide alternative DC support, such as Multi-Radio-Access-Technology (MR) DC with the Evolved Packet Core (EPC), MR-DC with the 5G Core (5GC), and/or NR E-UTRAN (NE) DC. As compared to the configuration shown in FIG. 2A, the additional backhaul connection between the eNodeB and gNB can introduce undesirable network latency at times, thereby lowering user throughput and possibly causing poor network performance to user.

The Dual Connectivity support has been shown to provide better service continuity when there are many UE mobility events. However, the two branches of the Dual Connectivity can have different network characteristics that lead to different throughput performance. Furthermore, for fixed UEs, such as Fixed Wireless Access (FWA) devices, the importance of having consistent throughput performance can outweigh the importance of service continuity during mobility events.

Frequency Domain Duplexing (FDD) and Time Domain Duplexing (TDD) configurations in the network can also impact coverage and capacity for UE communication. In general, FDD is considered better for providing wider coverage while TDD is considered to be better for providing bandwidth and capacity. In 5G systems, FDD/TDD carrier aggregation (CA) can be provided to improve throughput and coverage. However, the need for FDD, TDD, and/or FDD/TDD CA can change based on the UE movements and/or application service types.

There remains a need to differentiate network configurations for optimal throughput levels based on different types of UEs and/or different types of application services. This patent document discloses techniques that can be implemented in various embodiments to enable the RAN to dynamically adapt network configurations. At the RAN level, network operators can access location service data of the UE, including location information of the UE, network statistics, and/or service-related information. Network operators can monitor the location-service data of the UE and proactively steer the UE to appropriate RAT, multiplexing modes, and/or frequency layers based on the user types and/or service types to ensure sufficient throughput levels for the UEs and/or application services.

Table 1 shows example location-service data record of a service session associated a user device. The location-service data record can include various types of information, such as the UE location, handover information, EN-DC information (if configured), uplink or downlink data volume at different network layers, etc. The location-service data can also include the current throughput values for downlink and/or uplink transmissions. Each service session (e.g., data or voice session) can have a corresponding location-service data record associated with the session.

TABLE 1

| Data Field | Value |
| --- | --- |
| Model | iPhone 11 |
| End Location (latitude) | 47.61 N |
| End Location (longitude) | 122.20 W |
| Handover Source Cell | Cell A |
| Handover Target Cell | Cell B |
| EN-DC Duration Rate [%] | 70% |

TABLE 1-continued

| Data Field | Value |
| --- | --- |
| Mean Throughput DL [kbps] | 800 |
| Mean Throughput UL [kbps] | 70 |

In some embodiments, based on the correspondence between the location-service date record and the service session, the base station can determine a particular type of service associated with the service session that requires specific throughput levels based on the location-service data record. For example, if the location-service data record includes a session identifier that is associated with a benchmark performance service, the base station can determine that the session or the associated network connection requires the maximum available throughput in downlink and/or uplink directions. The base station can proceed to reconfigure the connection if needed.

In some embodiments, the base station can derive the service types based on a set of location-service data records. The base station can derive such information by aggregating the location-service data records over a predetermined time duration. The aggregation can happen on an hourly or daily basis for UEs that have heavy traffic. For UEs that have light traffic (e.g., devices in rural areas), the predetermined time duration can be extended to allow a sufficient number of location-service data records to be aggregated. The base station can determine whether a certain type of service sessions is associated with a higher throughput requirement by statistically tracking the aggregated location-service data records (e.g., inspecting the mean throughput values). The base station can also assign a corresponding operator-defined threshold for subsequent monitoring. Different operator-defined thresholds can be assigned for different frequency bands used for the connection. If the base station later observes a lower than desired throughput value for this type of service sessions, the base station can trigger reconfiguration of the connection(s) to ensure that sufficient user throughput can be provided.

In some embodiments, the base station may want to adaptively adjust network configurations for a group of UEs that share similar characteristics. The base station can derive the common UE characteristics by aggregating the location-service data records over a predetermined time duration (e.g., a day, a week, or a month, etc.). Once the aggregated location-service date records are obtained for each UE, the base station can correlate the records to determine certain common characteristics among the UEs. For example, the base station can correlate the make and model information for multiple UEs and categorize the UEs into different profile groups. As another example, the base station can correlate the source and target cells associated with handover events to categorize the UEs into different mobility groups. In some embodiments, the base station can identify a group of UEs based on the correlation of the location-service data records and assign the group of UEs a unique service profile identifier (SPID). The SPID can enable the base station to perform the same reconfiguration operation on a group of UEs.

In some embodiments, the base station can monitor the aggregated location-service data records to identify if a user or a user group having a particular SPID fails to satisfy the throughput requirement. Based on the location-service data, the base station can also identify the cause for the failure. For example, if DC is configured, the base station can examine whether one branch of the DC has become the bottleneck for providing sufficient throughput. If so, the base station can reconfigure the UE or UE group to use single connectivity. As another example, if the UE or UE group is configured with FDD/TDD CA, the base station can determine whether reconfiguration to TDD is desirable to provide the needed throughput for the relevant service(s).

Several examples of improving downlink and/or uplink throughput are described herein.

Example 1: Downlink Throughput for DC Scenario

Figure 3:
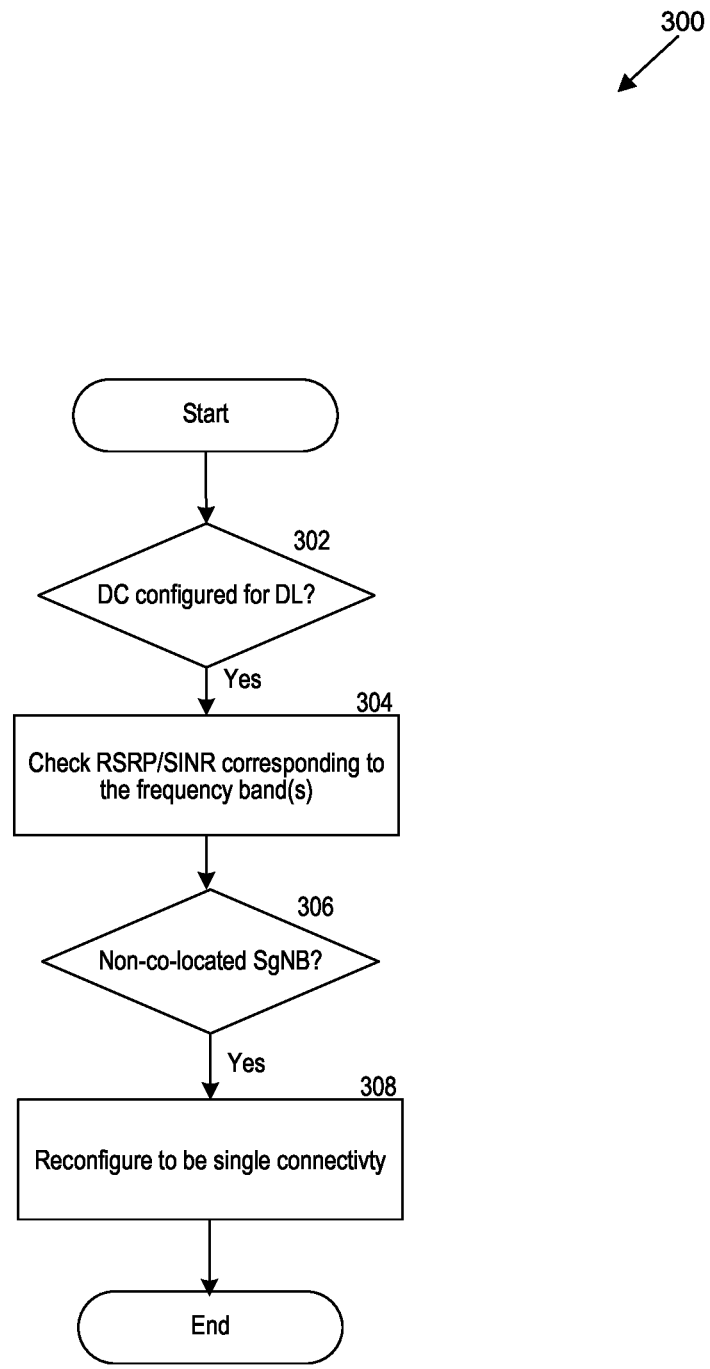
FIG. 3 illustrates an example flowchart for reconfiguring network connection in accordance with one or more embodiments of the present technology.

FIG. 3 illustrates an example flowchart 300 for reconfiguring network connection in accordance with one or more embodiments of the present technology. At operation 302, the base station determines whether DC is configured for downlink transmissions for a UE or a group of UEs having the same SPID. If DC is configured for the downlink transmissions, the base station can compare, at operation 304, the Reference Signal Received Power (RSRP) values, Signal Interference to Noise Ratio (SINR) values, and/or throughput values related to the downlink transmissions for the UE or the UE group with operator-defined thresholds. Different threshold values can be provided for different frequency bands for the downlink transmissions. If the location-service data indicates that the UE or the UE group fails to meet the requirement (e.g., having a lower-than-expected RSRP/SINR/throughput value), the base station can check at operation 306, whether a non-co-located secondary base station is configured. Referring back to FIG. 2B, as compared to the co-located deployment, a non-co-located secondary base station can cause additional network delays due to the backhaul connection. If so, the base station can reconfigure the connection at operation 308 to use single connectivity (e.g., LTE or NR only).

Example 2: Downlink Throughput for CA Scenario

Figure 4:
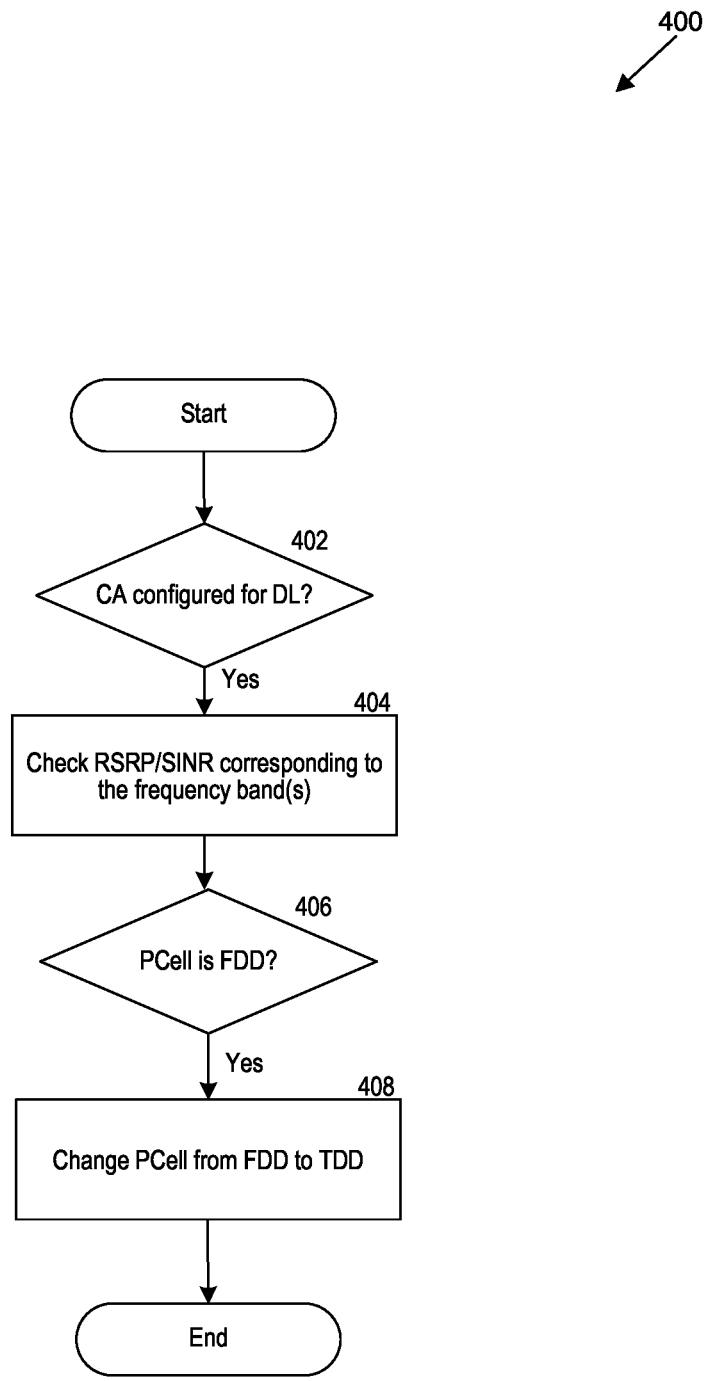
FIG. 4 illustrates another example flowchart for reconfiguring network connection in accordance with one or more embodiments of the present technology.

FIG. 4 illustrates another example flowchart 400 for reconfiguring network connection in accordance with one or more embodiments of the present technology. At operation 402, the base station determines whether CA is configured for downlink transmissions for a UE or a group of UEs having the same SPID. If CA is configured for the downlink transmissions, the base station can compare, at operation 404, the RSRP values, SINR values, and/or throughput values in the location-service data for the UE or the UE group with operator-defined thresholds. Different threshold values can be provided for different frequency bands. If the location-service data indicates that the UE or the UE group fails to meet the requirement (e.g., having a lower-than-expected RSRP/SINR/throughput value), the base station can check at operation 406, whether a Primary Cell (PCell) is configured to operate in the FDD mode. If so, the base station can reconfigure the PCell at operation 408 to operation in the TDD mode (e.g., with the highest bandwidth) to improve the user throughput.

Example 3: Uplink Throughput for DC Scenario

Figure 5:
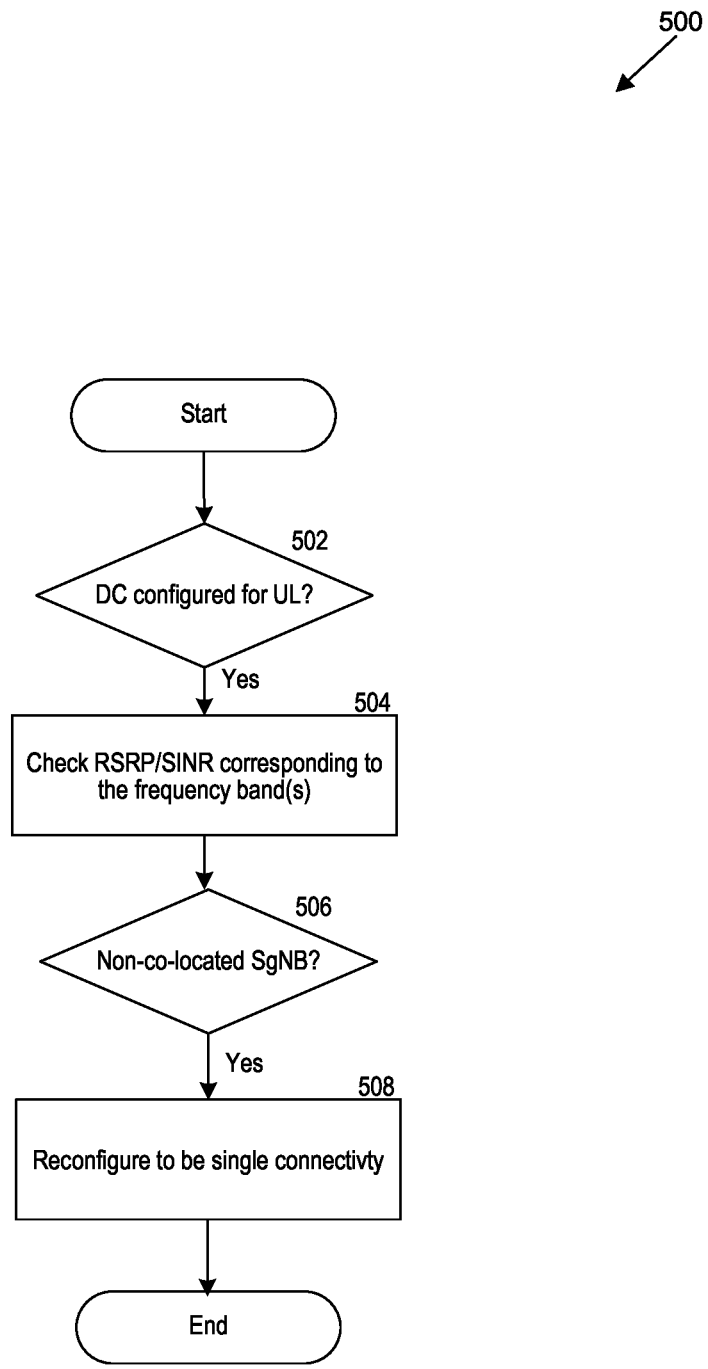
FIG. 5 illustrates another example flowchart for reconfiguring network connection in accordance with one or more embodiments of the present technology.

FIG. 5 illustrates an example flowchart 500 for reconfiguring network connection in accordance with one or more embodiments of the present technology. At operation 502, the base station determines whether DC is configured for uplink transmissions for a UE or a group of UEs having the same SPID. If DC is configured for the uplink transmissions, the base station can compare, at operation 504, the RSRP values, SINR values, and/or throughput values related to the uplink transmissions for the UE or the UE group with operator-defined thresholds. Different threshold values can be provided for different frequency bands for the downlink transmissions. If the location-service data indicates that the UE or the UE group fails to meet the requirement (e.g., having a lower-than-expected RSRP/SINR/throughput value), the base station can check at operation 506, whether a non-co-located secondary base station is configured. If so, the base station can reconfigure the connection at operation 508 to use single connectivity (e.g., LTE or NR only).

Example 4: Uplink Throughput for CA Scenario

Figure 6:
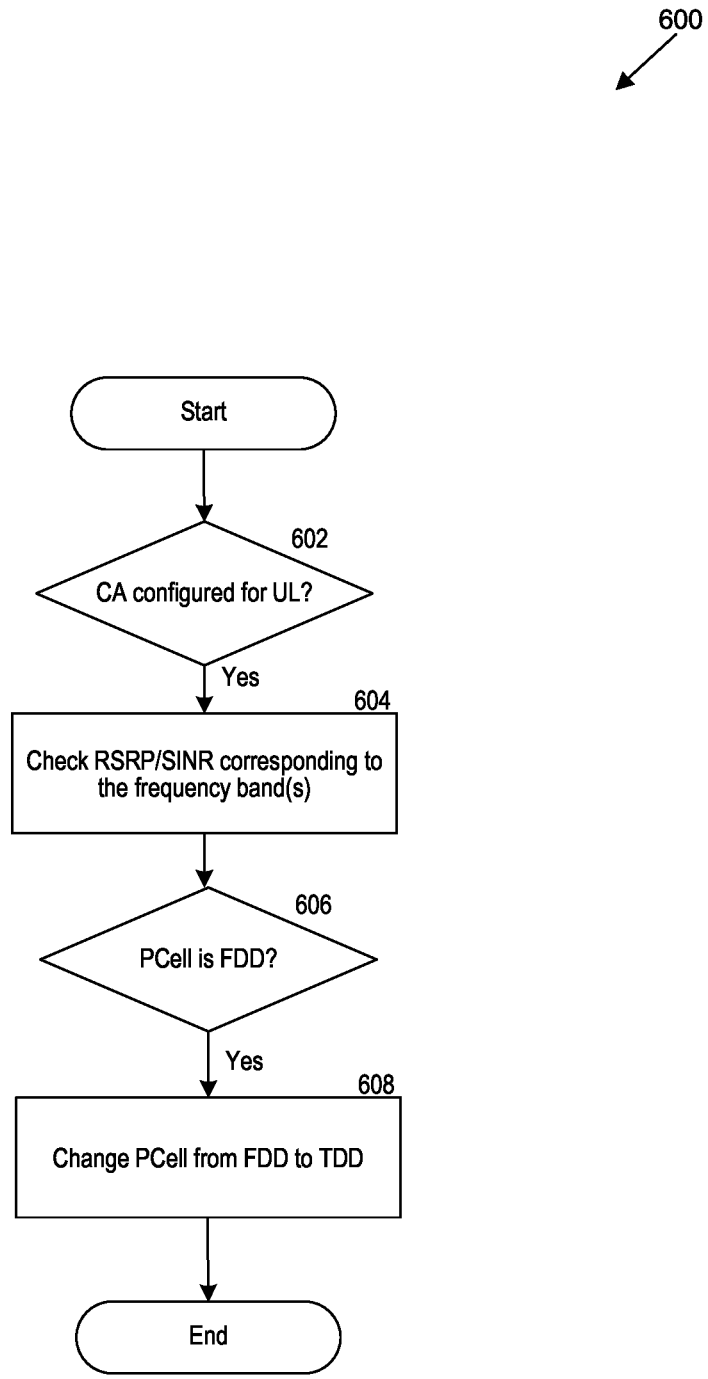
FIG. 6 illustrates yet another example flowchart for reconfiguring network connection in accordance with one or more embodiments of the present technology.

FIG. 6 illustrates another example flowchart 600 for reconfiguring network connection in accordance with one or more embodiments of the present technology. At operation 602, the base station determines whether CA is configured for uplink transmissions for a UE or a group of UEs having the same SPID. If CA is configured for the uplink transmissions, the base station can compare, at operation 604, the RSRP values, SINR values, and/or throughput values in the location-service data for the UE or the UE group with operator-defined thresholds. Different threshold values can be provided for different frequency bands. If the location-service data indicates that the UE or the UE group fails to meet the requirement (e.g., having a lower-than-expected RSRP/SINR/throughput value), the base station can check at operation 606, whether a PCell is configured to operate in the FDD mode. If so, the base station can reconfigure the PCell at operation 608 to operation in the TDD mode (e.g., with the highest bandwidth) to improve the user throughput.

The above examples can be combined with each other to achieve desired user throughput level in the downlink and/or uplink directions. In some embodiments, the base station can further identify co-located frequency layers that has additional available bandwidth and redirect the UE traffic to these identified layers.

Figure 7:
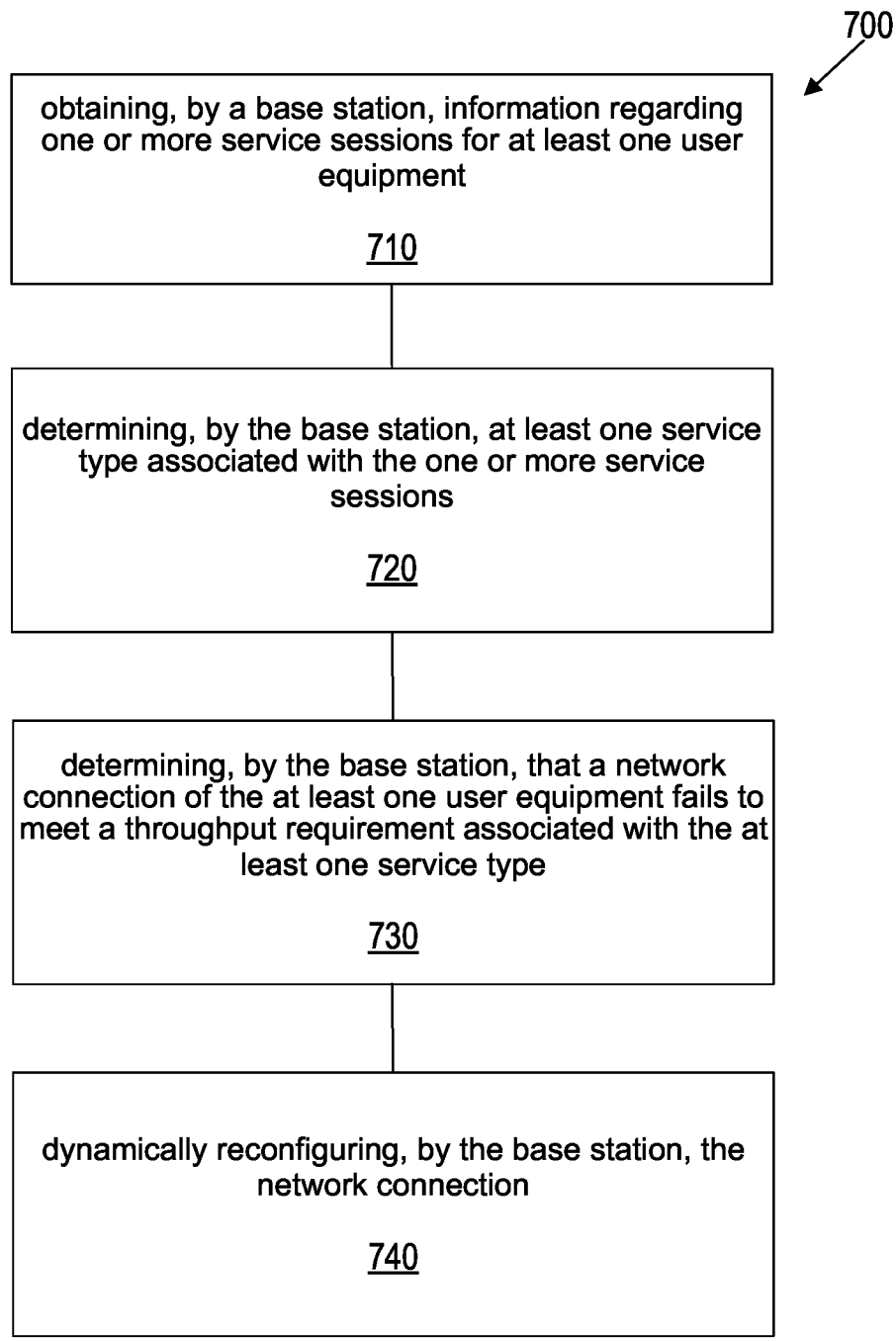
FIG. 7 is a flowchart representation of a method for wireless communication in accordance with one or more embodiments of the present technology.

FIG. 7 is a flowchart representation of a process or a method for wireless communication in accordance with one or more embodiments of the present technology. The process 700 include, at operation 710, obtaining, by a base station, information regarding one or more service sessions for at least one user equipment (e.g., location-service data of a UE). The process 700 includes, at operation 720, determining, by the base station, at least one service type associated with the one or more service sessions based on the information. The process 700 includes, at operation 730, determining, by the base station, that a network connection of the at least one user equipment fails to meet a throughput requirement associated with the at least one service type. The determining is performed by comparing at least one value included in the information (e.g., RSRP/SINR/throughput) with a predefined threshold that corresponds to a frequency band in which the user equipment operates. The process 700 includes, at operation 740, dynamically reconfiguring, by the base station, the network connection based on the determining. The dynamically reconfiguring can include reconfiguring the network connection to be single connectivity in response to the network connection being configured as dual connectivity having two serving nodes that are not co-located. The dynamically reconfiguring can also include reconfiguring a primary cell of the at least one user equipment to operate in a Time-Division Duplexing (TDD) mode in response to the primary serving cell being configured to operate in a Frequency-Division Duplexing (FDD) mode.

In some embodiments, the process further comprises categorizing, by the base station, the at least one user equipment into one or more user groups based on common characteristics indicated by the information and assigning, by the base station, a service profile identifier to each of the one or more user groups. The network connection can be configured for a downlink transmission from the base station to the at least one user equipment. The network connection is configured for an uplink transmission from the base station to the at least one user equipment.

Figure 8:
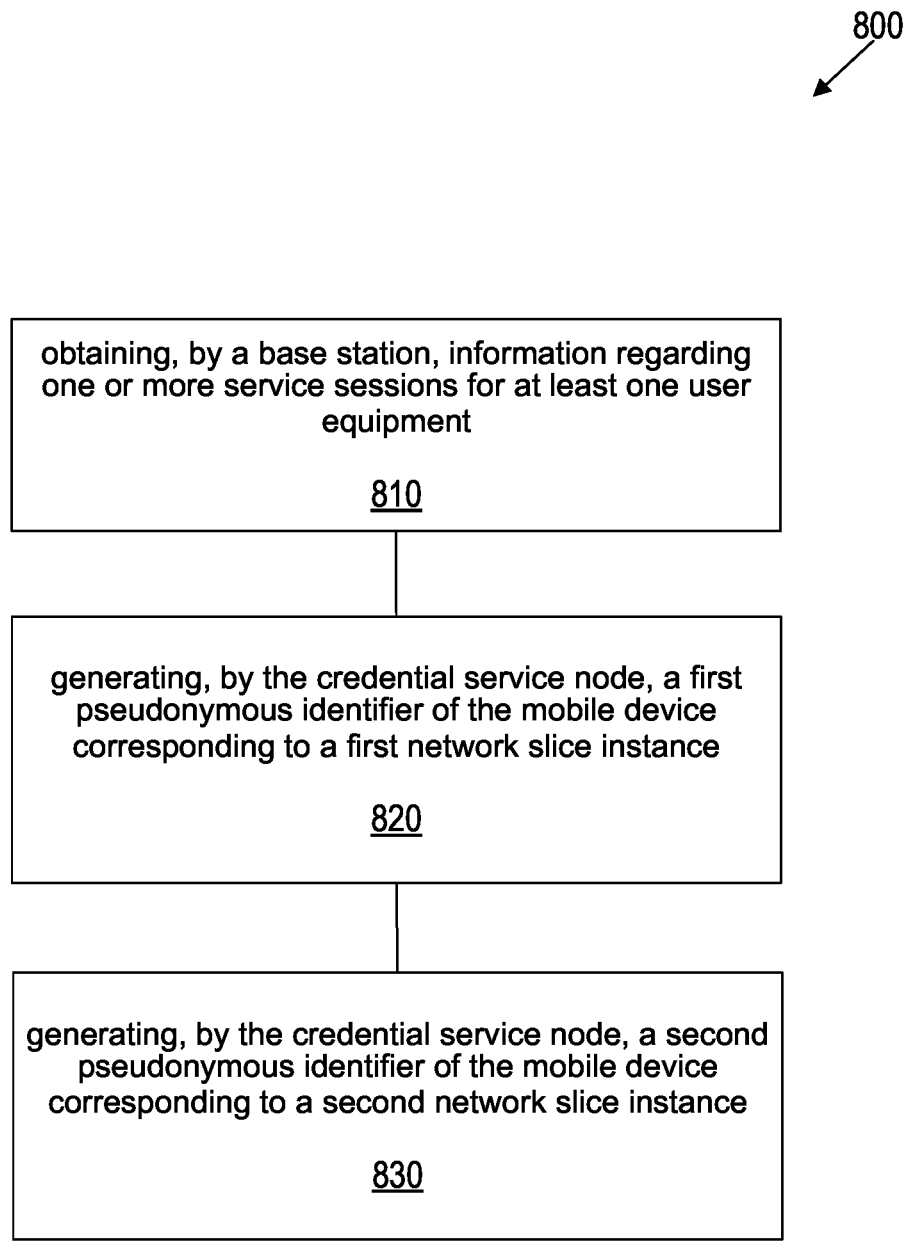
FIG. 8 is a flowchart representation of another method or a process for wireless communication in accordance with one or more embodiments of the present technology.

FIG. 8 is a flowchart representation of a process or a method for wireless communication in accordance with one or more embodiments of the present technology. The process 800 includes, at operation 810, obtaining, by a base station, information regarding a user session for a user equipment. The process 800 includes, at operation 820, determining, by the base station, whether the user session is related to a service type having a specific throughput requirement. The process 800 also includes, at operation 830, selectively reconfiguring, by the base station, a network connection for the user session. The selectively reconfiguring can be performed by reconfiguring the network connection to be single connectivity in response to the network connection being configured as dual connectivity having two serving nodes that are not co-located. The selectively reconfiguring can also be performed by reconfiguring a primary cell of the at least one user equipment to operate in a TDD mode in response to the primary serving cell being configured to operate in a FDD mode.

In some embodiments, the service type comprises a benchmark performance service. The network connection can be configured for a downlink transmission from the base station to the user equipment or configured for an uplink transmission from the user equipment to the base station.

Computer System

Figure 9:
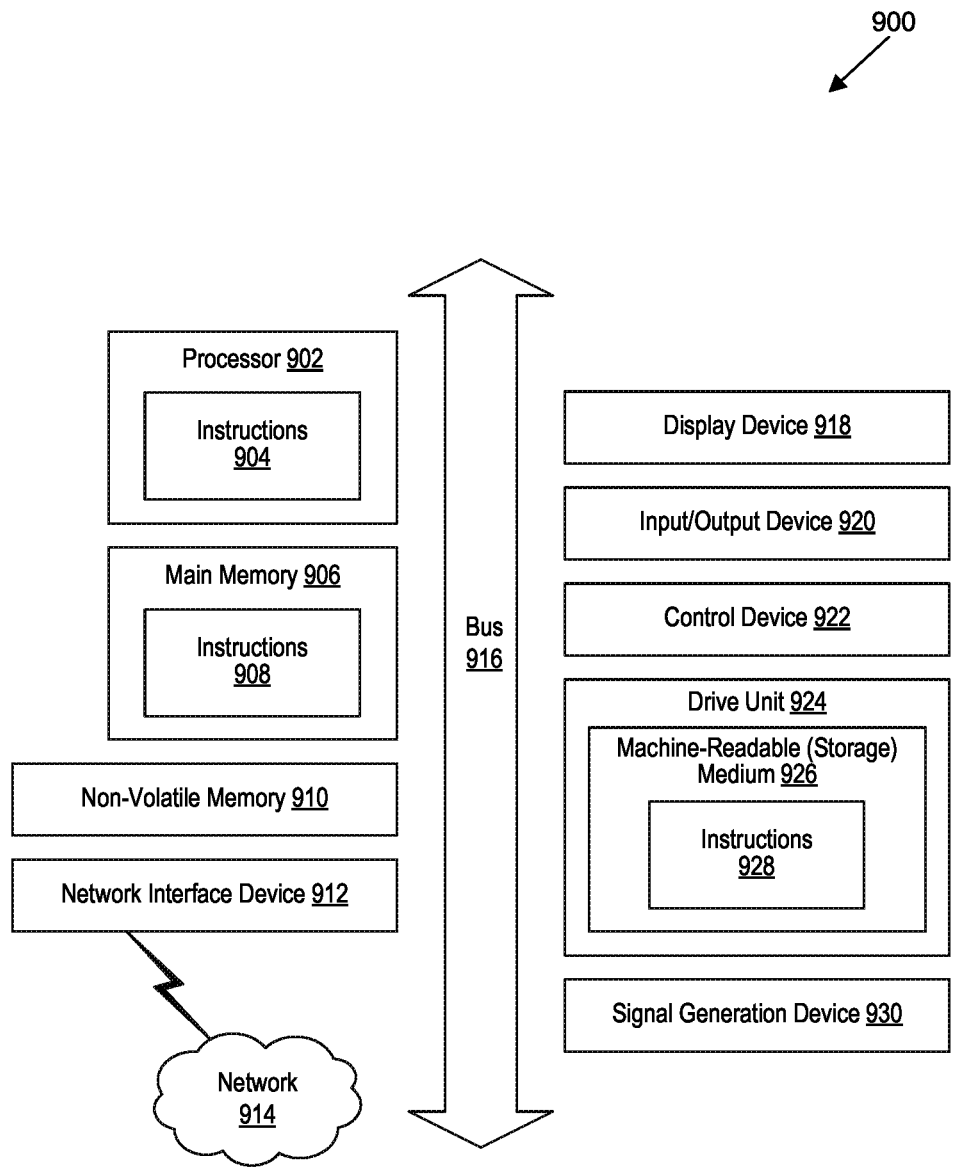
FIG. 9 is a block diagram that illustrates components of a computing device.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, video display device 918, an input/output device 920, a control device 922 (e.g., keyboard and pointing device), a drive unit 924 that includes a storage medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computing system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 900. In some implementation, the computer system 900 can be an embedded computer system, a system-on-chip (SOC), a single-board computer system (SBC) or a distributed system such as a mesh of computer systems or include one or more cloud components in one or more networks. Where appropriate, one or more computer systems 900 can perform operations in real-time, near real-time, or in batch mode.

The network interface device 912 enables the computing system 900 to mediate data in a network 914 with an entity that is external to the computing system 900 through any communication protocol supported by the computing system 900 and the external entity. Examples of the network interface device 912 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computing system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computing system 900 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

What is claimed is:

1. A method for wireless communication, comprising:
   obtaining, at a base station, information regarding one or more service sessions for at least one user equipment;
   determining, at the base station, at least one service type associated with the one or more service sessions based on the information;
   determining, at the base station, a network connection of the at least one user equipment fails to meet a throughput requirement associated with the at least one service type,
      wherein the determining is based on comparing at least one value included in the information with a predefined threshold, wherein the predefined threshold corresponds to a frequency band in which the at least one user equipment operates;
   categorizing, by the base station, the at least one user equipment into one or more user groups based on common characteristics indicated by the information;
   assigning, by the base station, a service profile identifier to each of the one or more user groups; and
   dynamically reconfiguring network connections for a group of user equipment sharing a same service profile identifier based on the determining.

2. The method of claim 1, wherein the dynamically reconfiguring comprises:
   reconfiguring the network connection to be single connectivity in response to the network connection being configured as dual connectivity having two serving nodes that are not co-located.

3. The method of claim 1, wherein the dynamically reconfiguring comprises:
   reconfiguring a primary cell of the at least one user equipment to operate in a Time-Division Duplexing (TDD) mode in response to the primary cell being configured to operate in a Frequency-Division Duplexing (FDD) mode.

4. The method of claim 1, wherein the network connection is configured for a downlink transmission from the base station to the at least one user equipment.

5. The method of claim 1, wherein the network connection is configured for an uplink transmission from the base station to the at least one user equipment.

6. A method for wireless communication, comprising:
   obtaining, at a base station, information regarding a user session of a user equipment;
   determining, at the base station, whether the user session is related to a service type having a specific throughput requirement;
   categorizing, by the base station, the at least one user equipment into one or more user groups based on common characteristics indicated by the information;
   assigning, by the base station, a service profile identifier to each of the one or more user groups;
   selectively reconfiguring, by the base station, a network connection for the user session, wherein the selectively reconfiguring comprises at least one of:
      reconfiguring the network connection to be single connectivity in response to the network connection being configured as dual-connectivity having two serving nodes that are not co-located; or
      reconfiguring a primary cell of the user equipment to operate in a Time-Division Duplexing (TDD) mode in response to the primary cell being configured to operate in a Frequency-Division Duplexing (FDD) mode.

7. The method of claim 6, wherein the selectively reconfiguring further comprises:
   identifying one or more frequency layers that have additional available bandwidth; and
   redirecting traffic of the network connection to the one or more frequency layers.

8. The method of claim 6, wherein the service type comprises a benchmark performance service.

9. The method of claim 6, wherein the network connection is configured for a downlink transmission from the base station to the user equipment or is configured for an uplink transmission from the user equipment to the base station.

10. The method of claim 6 further comprising:
    determining, at the base station, that the network connection fails to meet the throughput requirement associated with the service type by comparing at least one value included in the information with a predefined threshold.

11. The method of claim 6, wherein the predefined threshold corresponds to a frequency band in which the at least one user equipment operates, the method further comprising:
    determining different predefined thresholds corresponding to different frequency bands.

12. A device for wireless communication, comprising a processor that is configured to:
    obtain information regarding one or more service sessions of at least one user equipment;
    determine at least one service type associated with the one or more service sessions based on the information;
    categorize the at least one user equipment into one or more user groups based on common characteristics indicated by the information;
    assign a service profile identifier to each of the one or more user groups; and
    selectively reconfigure a network connection of the at least one service type to satisfy a throughput requirement associated with the at least one service type.

13. The device of claim 12, wherein the processor is configured to:
    determine that the network connection fails to meet the throughput requirement associated with the at least one service type by comparing at least one value included in the information with a predefined threshold.

14. The device of claim 13, wherein the predefined threshold corresponds to a frequency band in which the at least one user equipment operates, and wherein the processor is further configured to:

determine different predefined thresholds corresponding to different frequency bands.

15. The device of claim 12, wherein the processor is configured to:

reconfigure the network connection to be single connectivity in response to the network connection being configured as dual connectivity having two serving nodes that are not co-located.

16. The device of claim 12, wherein the processor is configured to:

reconfigure a primary cell of the at least one user equipment to operate in a Time-Division Duplexing (TDD) mode in response to the primary cell being configured to operate in a Frequency-Division Duplexing (FDD) mode.

17. The device of claim 12, wherein the processor is configured to:

identify one or more frequency layers that have additional available bandwidth; and redirect traffic of the network connection to the one or more frequency layers.

18. The device of claim 17, wherein the processor is further configured to:

reconfigure network connections for a group of user equipment sharing a same service profile identifier.

19. The device of claim 12, wherein the at least one service type comprises a benchmark performance service.

20. The device of claim 12, wherein the network connection is configured for a downlink transmission to the at least one user equipment or is configured for an uplink transmission from the at least one user equipment.

* * * * *